A system and method for identifying an object to be picked up by a robot. The method includes obtaining a 2D red-green-blue (RGB) color image and a 2D depth map image of the objects using a 3D camera, where pixels in the depth map image are assigned a value identifying the distance from the camera to the objects. The method generates a segmentation image of the objects using a deep learning convolutional neural network that performs an image segmentation process that extracts features from the RGB image, assigns a label to the pixels so that objects in the segmentation image have the same label and rotates the object using the orientation of the object in the segmented image. The method then identifies a location for picking up the object using the segmentation image and the depth map image and rotates the object when it is picked up.

20 Claims, 4 Drawing Sheets

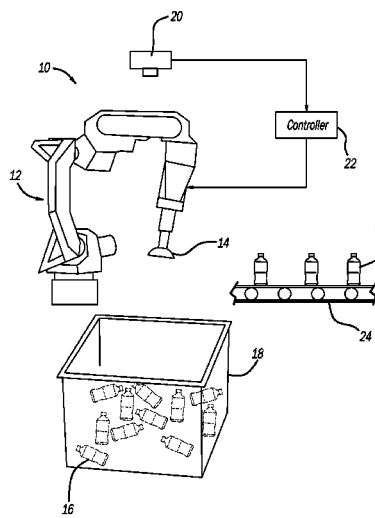

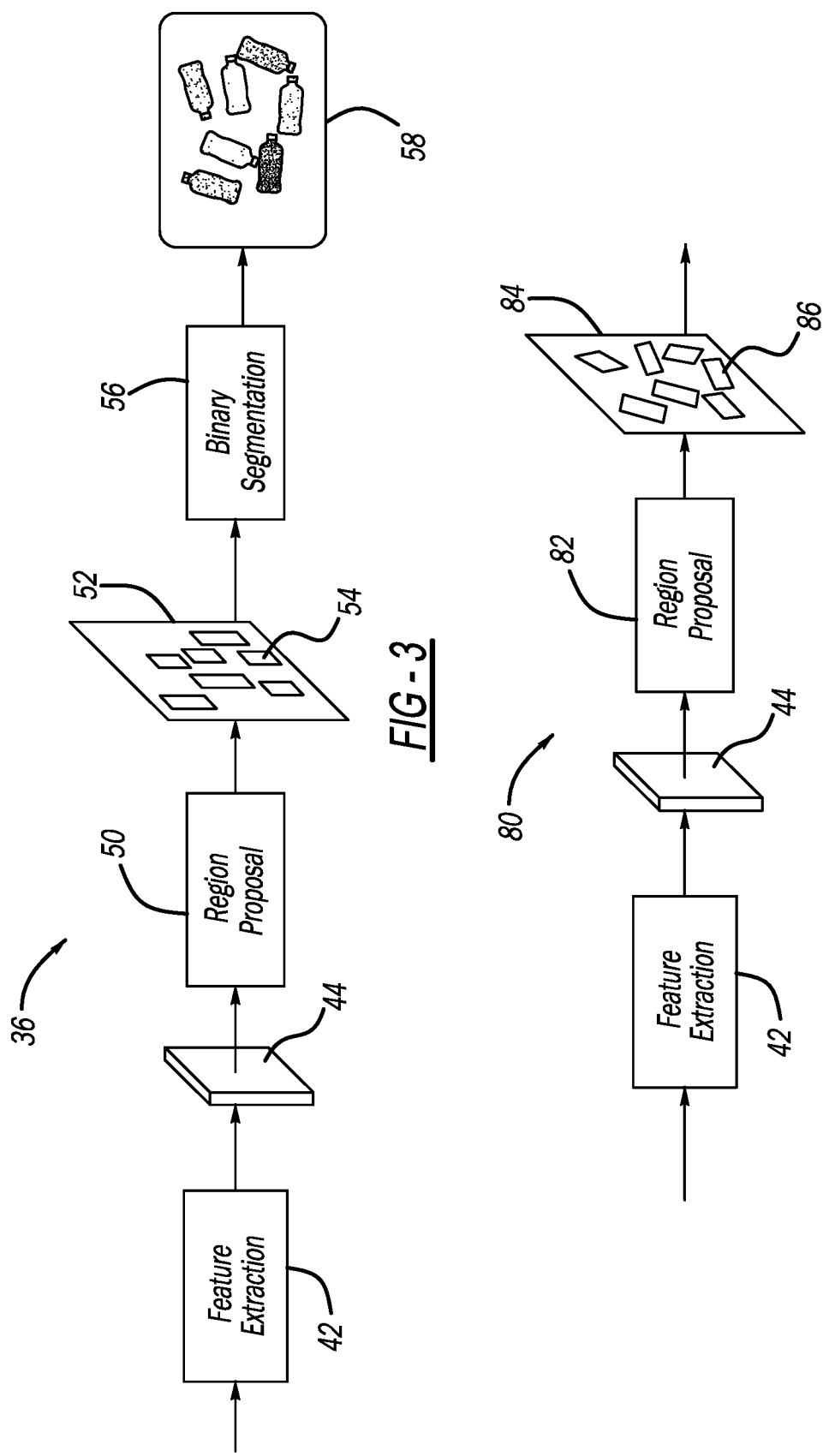

OBJECT BIN PICKING WITH ROTATION COMPENSATION

BACKGROUND

Field

This disclosure relates generally to a system and method for identifying an object to be picked up by a robot and, more particularly, to a system and method for identifying an object, such as a transparent object, to be picked up by a robot from a bin of objects, where the method employs an image segmentation process that uses neural networks to extract features from an image captured by a camera to provide an extracted features image, identifying x and y coordinates of pixels in the extracted features image and identifying an orientation of the objects in the segmentation image.

Discussion of the Related Art

Robots perform a multitude of tasks including pick and place operations, where the robot picks up and moves objects from one location, such as a bin, to another location, such as a conveyor belt. In order to identify an object being picked up from a bin, some robot systems employ a 3D camera that generates 2D red-green-blue (RGB) color images of the bin and 2D gray scale depth map images of the bin, where each pixel in the depth map image has a value that defines the distance from the camera to a particular object, i.e., the closer the pixel is to the object the lower its value. The depth map images identify distance measurements to points in a point cloud in the field-of-view of the camera, where a point cloud is a collection of data points that is defined by a certain coordinate system and each point has x, y and z value.

There are two general types of point cloud analysis for this purpose, namely, model-free point cloud analysis and model-based point cloud analysis. Model-free point cloud analysis includes identifying clusters of points in the point cloud in a normal direction from the camera and segmenting the clusters relative to each other, where each point cloud segment is identified as an object. Model-based point cloud analysis includes creating templates from a CAD model of the objects and then searching for the template in the point cloud. However, if the object that is being picked up by the robot is transparent, light propagates through the object and is not effectively reflected from a surface of the object. Therefore, the point cloud generated by the camera is not an effective representation of the object and the depth map image is not reliable, and thus the object cannot be properly identified to be picked up.

SUMMARY

The following discussion discloses and describes a system and method for identifying an object to be picked up by a robot from a bin of objects. The method includes obtaining a 2D red-green-blue (RGB) color image and a 2D depth map image of the objects using a 3D camera, where pixels in the depth map image are assigned a value identifying the distance from the camera to the objects. The method generates a segmentation image of the objects using a convolutional neural network that performs an image segmentation process that extracts features from the RGB image, assigns a label to the pixels so that objects in the segmentation image have the same label and determines an orientation of the objects. Generating a segmentation image includes providing a plurality of bounding boxes with different sizes and oriented in different directions, aligning the bounding boxes to the extracted features using a sliding window template, providing a bounding box image that includes bounding boxes surrounding the objects, determining the probability that an object exists in each bounding box and identifying a center pixel of each object in the bounding boxes. The method then identifies a location for picking up the object using the segmentation image and the depth map image and rotates the object using the orientation of the object in the segmented image, where obtaining a color image, obtaining a depth map image, generating a segmentation image and identifying a location for picking up the object are performed each time an object is picked up from the group of objects by the robot.

Additional features of the disclosure will become apparent from the following description and appended claims, taken in conjunction with the accompanying drawings.

BRIEF DESCRIPTION OF THE DRAWINGS

FIG. 3 is a schematic block diagram of a segmentation module separated from the system shown in FIG. 2 that provides image segmentation;

FIG. 4 is a schematic block of a segmentation module of the type shown in FIG. 3 that also employs object rotation compensation.

DETAILED DESCRIPTION OF THE EMBODIMENTS

The following discussion of the embodiments of the disclosure directed to a system and method for identifying an object to be picked up by a robot from a bin of the objects, where the method employs an image segmentation process that uses neural networks to extract features from an RGB image to provide an extracted features image, identifying x and y coordinates of pixels in the extracted features image and identifying an orientation of the objects in the segmentation image, is merely exemplary in nature, and is in no way intended to limit the invention or its applications or uses. For example, the system and method have application for identifying a transparent object to be picked up by a robot. However, the system and method may have other applications.

Figure 1:
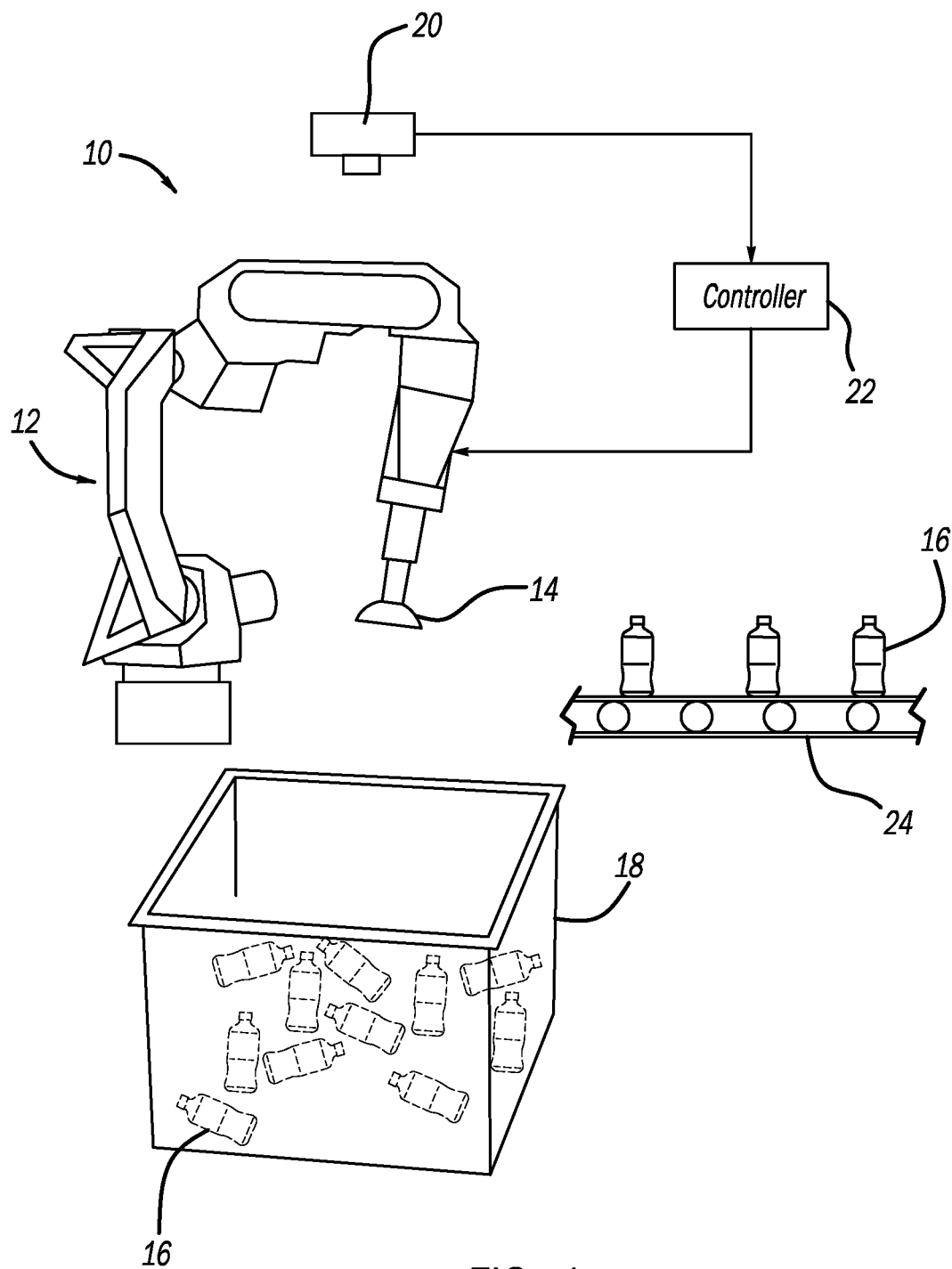
FIG. 1 is an illustration of a robot system including a robot picking up objects out of a bin.

FIG. 1 is an illustration of a robot system 10 including a robot 12 having an end-effector suction cup 14 that is shown picking up objects 16, for example, transparent bottles, from a bin 18. The system 10 is intended to represent any type of robot system that can benefit from the discussion herein, where the robot 12 can be any robot suitable for that purpose. A 3D camera 20 is positioned to take top down images of the bin 18 and provide them to a robot controller 22 that controls the movement of the robot 12. Because the objects 16 can be transparent, the controller 22 may not be able to rely on a depth map image provided by the camera 20 to identify the location of the objects 16 in the bin 18. In this non-limiting embodiment, the robot 12 places the objects 16 on a conveyor 24 possibly in a particular orientation, such as upright.

As will be discussed in detail below, the robot controller 22 employs an algorithm that allows the robot 12 to pick up the objects 16 without having to rely on an accurate depth map image. More specifically, the algorithm performs an image segmentation process using the different colors of the pixels in the RGB image from the 3D camera 20. Image segmentation is a process of assigning a label to every pixel in an image such that pixels with the same label share certain characteristics. Thus, the segmentation process predicts which pixel belongs to which of the objects 16.

Modern image segmentation techniques may employ deep learning technology. Deep learning is a particular type of machine learning that provides greater learning performance by representing a certain real-world environment as a hierarchy of increasing complex concepts. Deep learning typically employs a software structure comprising several layers of neural networks that perform nonlinear processing, where each successive layer receives an output from the previous layer. Generally, the layers include an input layer that receives raw data from a sensor, a number of hidden layers that extract abstract features from the data, and an output layer that identifies a certain thing based on the feature extraction from the hidden layers. The neural networks include neurons or nodes that each has a "weight" that is multiplied by the input to the node to obtain a probability of whether something is correct. More specifically, each of the nodes has a weight that is a floating point number that is multiplied with the input to the node to generate an output for that node that is some proportion of the input. The weights are initially "trained" or set by causing the neural networks to analyze a set of known data under supervised processing and through minimizing a cost function to allow the network to obtain the highest probability of a correct output.

Figure 2:
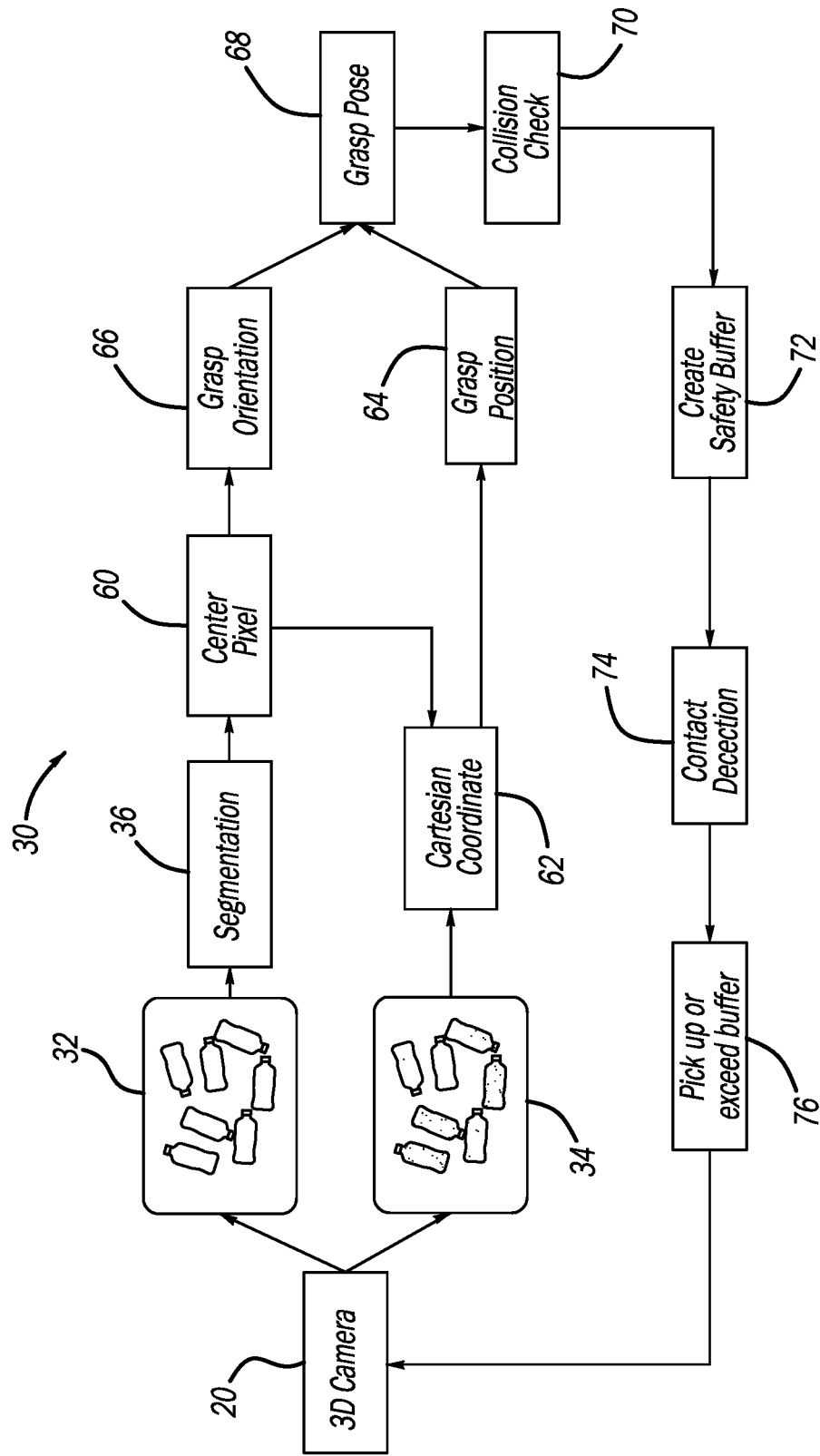
FIG. 2 is a schematic block diagram of a bin picking system for picking up the objects from the bin in the robot system shown in FIG. 1.

FIG. 2 is a schematic block diagram of a bin picking system 30 that is part of the controller 22 in the robot system 10 that operates to pick up the objects 16 out of the bin 18. The system 30 receives a 2D RGB image 32 of a top down view of the bin 18 and a 2D depth map image 34 of the top down view of the bin 18 from the camera 20, where the depth map image 34 may not be reliable because the objects 16 may be transparent. The image 32 is provided to a segmentation module 36 that preforms an image segmentation process, where each pixel in the image 32 is assigned a certain label and where the pixels associated with the same object 16 have the same label.

FIG. 3 is a schematic block diagram of the module 36 separated from the system 30. The RGB image 32 is provided to a feature extraction module 42 that performs a filtering process that extracts important features from the image 32, which removes background and noise. For example, the module 42 may include learned-based neural networks that extract gradients, edges, contours, elementary shapes, etc. from the image 32, where the module 42 provides an extracted features image 44 of the RGB image 32 in a known manner. The feature image 44 is provided to a region proposal module 50 that analyzes, using neural networks, the identified features in the image 44 to determine the location of the objects 16 in the image 44. Particularly, the module 50 includes trained neural networks providing a number of bounding boxes, such as 50 to 100 boxes, of different sizes, i.e., boxes having various lengths and widths, that are used to identify the probability that an object 16 exists at a certain location in the image 44. In this embodiment, the bounding boxes are all vertical boxes, which helps reduce the complexity of the module 50. The region proposal module 50 employs a sliding search window template, well known to those skilled in the art, where a search window including all of the bounding boxes is moved over the feature image 44, for example, from a top left of the image 44 to a bottom right of the image 44, to look for features that identify the probable existence of one of the objects 16.

The sliding window search produces a bounding box image 52 including a number of bounding boxes 54 that each surrounds a predicted object in the image 44, where the number of bounding boxes 54 in the image 52 will be reduced each time the robot 12 removes one of the objects 16 from the bin 18. The module 50 parameterizes a center location (x, y), width (w) and height (h) of each box 54 and provides a prediction confidence value between 0% and 100% that an object 16 exists in the box 54. The image 52 is provided to a binary segmentation module 56 that estimates, using a neural network, whether a pixel belongs to the object 16 in each of the bounding boxes 54 to eliminate background pixels in the box 54 that are not part of the object 16. The remaining pixels in the image 52 in each of the boxes 54 are assigned a value for a particular object 16 so that a 2D segmentation image 58 is generated that identifies the objects 16 by different indicia, such as color. The image segmentation process as described is a modified form of a deep learning mask R-CNN (convolutional neural network).

The 2D segmentation image 58 is then provided to a center pixel module 60 that determines which segmented object in the image 58 has the highest confidence value for being an object and provides the x-y coordinate of the center pixel for the selected object 16. The identified center pixel of the selected object 16 is provided to a Cartesian coordinate module 62 along with the depth map image 34 that calculates the x-y-z Cartesian coordinate of the center pixel of that object 16, where the depth map image 34 estimates or predicts each pixels location in the real world, although the z depth prediction is not very reliable. The x-y-z coordinate of the center pixel for that object 16 is then used to identify the x-y-z grasp position in a grasp position module 64 for positioning the suction cup 14. The x-y coordinate of the center pixel of the selected object 16 is also sent to a grasp orientation module 66 that determines the grasp orientation, i.e., the roll, pitch and yaw, of the suction cup 14 based on a ray direction from the camera 20 to the center pixel of the object 16 using, for example, a pin-hole camera model, well known to those skilled in the art, where the motion of the suction cup 14 when it is picking up the object 16 will move along and be aligned with the ray direction. It is necessary to determine the ray direction from the camera 20 because the depth map image 34 is not able to provide an accurate distance between the camera 20 and the object 16.

The grasp position of the suction cup 14 and the grasp orientation of the suction cup 14 are combined in a grasp pose module 68 to provide the grasp pose of the suction cup 14, where the grasp pose includes the x-y-z coordinates and the yaw, pitch and roll position of the suction cup 14 to provide the approach orientation of the suction cup 14 along the ray direction to the object 16. A collision check module 70 determines whether the grasp pose will cause the suction cup 14 to collide with the bottom of the bin 18 along the calculated ray direction, where the distance to the bottom of the bin 18 is known. If the grasp pose will cause a collision with the bin 18 along the ray direction, then a safety buffer is created in a safety buffer module 72 to limit the movement of the robot 12 along the ray direction.

As the suction cup 14 moves along the ray direction it will eventually contact the object 16 being picked up. A contact detection module 74 detects that the suction cup 14 has made contact with the object 16 by detecting a pressure difference in the vacuum. The robot 12 stops its motion and picks up the object 16 at a pick-up module 76 or reaches the buffer distance, where it will not pick up the object 16. Once the object 16 is picked up and moved by the robot 12, the camera 20 will take a next image of the bin 18 that will not have the objects 16 that have already been picked up to pick up the next object 16. This process is continued until all of the objects 16 have been picked up out of the bin 18.

The technique discussed above for picking up the objects 16 from the bin 18 only determines the center pixel of the object 16 in the image 58 as the location where the suction cup 14 grasps the object 16, where the robot 12 moves or approaches the object 16 along a line to that center point of the object 16 to pick up the object 16. However, the robot 12 does not know the orientation of the object 16 around that center point, and thus will only be able to place the objects 16 in a random orientation once they are picked up. In other words, the segmentation module 36 only identifies the group of pixels that make up the object 16, but does not identify the orientation or rotation of the object 16. However, there may be applications where it is desirable to orient the objects 16 in a certain manner, such as align the objects 16 in the same direction, for example, on the conveyor 24, that will require the robot 12 to turn or rotate the object 16 after it is picked up. For these types of robotic systems it is not only necessary to determine the center of the object 16 to be picked up, but it is also necessary to determine the orientation of the object 16 being picked up so that the robot 12 can rotate the object 16 and align it with the desired orientation when the robot 12 places the object 16 on the conveyor 24. Thus, all of the objects 16 can be aligned in the same direction on the conveyor 24 or even placed standing up on the conveyor 24. It is noted that determining the orientation of the object 16 requires more complexity than determining just the center of the object 16, and as such requires significantly more neural network training.

FIG. 4 is a schematic block diagram of a segmentation module 80 that is similar to the segmentation module 36, but also identifies the orientation of the object 16 being picked up, where like elements to the module 36 are identified by the same reference number. It is noted that the image 32 may be from a 2D camera, where the depth image 34 is not required and where the distance to the objects 16 may be known in advance. The module 80 includes the feature extraction module 42 that performs a filtering process that extracts important features from the image 32, as discussed above, and provides the feature image 44. However, in this embodiment, the feature image 44 is provided to a region proposal module 82 that is a much more complex neural network, such as a complex deep learning mask R-CNN, than that in the module 50 and that requires significant more neural network training. Particularly, instead of using several vertical bounding boxes of different sizes to identify the locations of the objects 16 in the image 44, the module 82 uses a number bounding boxes having different sizes, i.e., widths and lengths, where for each size box a bounding box is provided having several orientations, i.e., rotated at many different angles, such as 0°, 30°, 45°, 90°, 120°, 150° and 180°, and with different elevation angles. Therefore, for each size bounding box there may be several bounding boxes having different orientations for that size. As above, the region proposal module 80 performs a sliding window search by moving or sliding a search window template including the bounding boxes over the feature image 44, for example, from a top left of the image 44 to a bottom right of the image 44, to align one of the bounding boxes with the objects 16 in the feature image 44, but since there are many more boxes with different orientations, the region proposal module 82 is able to predict the orientation of the object 16 it identifies in the image 44. The output of the module 82 is a bounding box image 84 having bounding boxes 86 showing the orientation of the objects 16. Therefore, the module 82 parametrizes the orientation ($\theta$) in addition to the center location (x, y), the width (w) and the height (h) of each box 86 and provides a prediction confidence value between 0% and 100% that an object 16 exists in the box 86. In this process, although the bounding boxes 86 are rectangular, they tightly fit around the object 16 because of the angle of the box 86, and thus the process for removing background pixels performed by the binary segmentation module 56 is not required.

Figure 5:
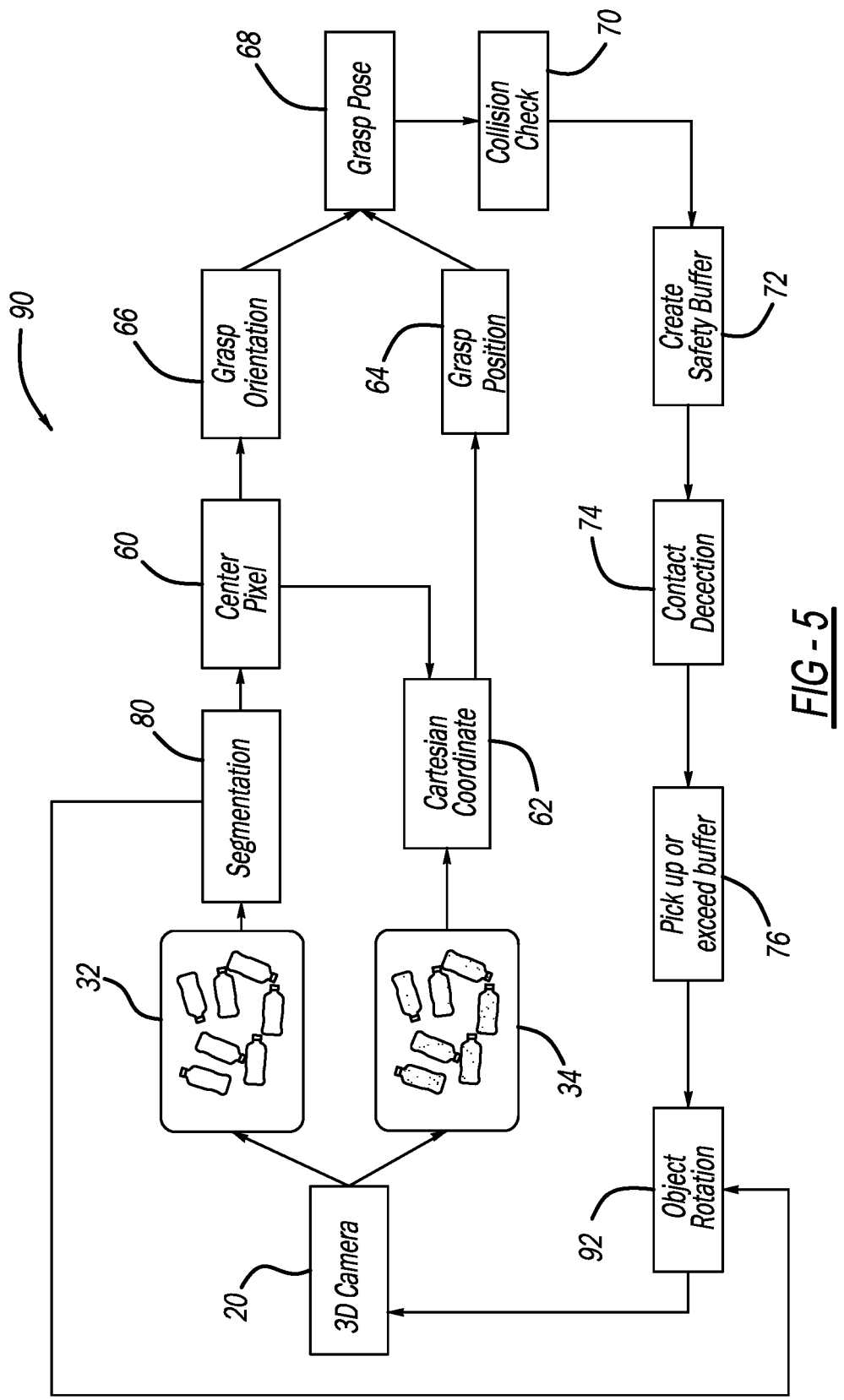
FIG. 5 is a schematic block diagram of a bin picking system of the type shown in FIG. 2 employing the segmentation module shown in FIG. 4 and providing object rotation compensation.

FIG. 5 is a schematic block diagram of a bin picking system 90 of the type shown in FIG. 2 that employs rotation compensation to allow the robot 12 to rotate the object 16 after it is picked up to be in a certain orientation, where like elements to the system 30 are identified by the same reference number. In this embodiment, the module 36 is replaced with the module 80. Further, the system 90 includes an object rotation module 92 that receives the rotation parameter $\theta$ from the segmentation module 80, and once the robot 12 picks up the selected object 16 from the bin 18 and raises it a certain height to clear the other objects 16, will rotate the object 16 the desired amount determined by the rotation parameter $\theta$ in all of the x-y-z directions.

As will be well understood by those skilled in the art, the several and various steps and processes discussed herein to describe the disclosure may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for picking up an object from a group of objects, said method comprising:
   obtaining an image of the objects using a camera;
   generating a segmentation image of the objects by performing an image segmentation process that includes using neural networks to extract features from the image to provide an extracted features image, identifying x and y coordinates of pixels in the extracted features image and identifying an orientation of the objects in the extracted features image, wherein generating a segmentation image includes identifying a center pixel of each object;

identifying a location for picking up the object using the segmentation image, wherein identifying a location for picking up the object includes identifying the center pixel of one of the objects in the segmentation image and calculating x-y-z coordinates of the center pixel using the location of that center pixel and a depth map image; and rotating the object using the orientation of the object in the segmentation image.

2. The method according to claim 1 wherein the neural networks are deep learning mask R-convolutional neural networks (CNN).

3. The method according to claim 1 wherein generating a segmentation image includes providing a plurality of bounding boxes, aligning the bounding boxes to the extracted features and providing a bounding box image that includes bounding boxes surrounding the objects.

4. The method according to claim 3 wherein the bounding boxes have various sizes and a plurality of bounding boxes of each size are oriented in different directions.

5. The method according to claim 4 wherein the bounding boxes of the same size that are oriented in different directions are oriented 0°, 30°, 45°, 90°, 120°, 150° and 180° relative to each other.

6. The method according to claim 3 wherein aligning the bounding boxes includes using a sliding window template.

7. The method according to claim 3 wherein generating a segmentation image includes determining the probability that an object exists in each bounding box.

8. The method according to claim 1 wherein generating a segmentation image includes assigning a label to pixels in the segmentation image so that each object in the segmentation image has the same label.

9. The method according to claim 1 wherein identifying a location for picking up the object includes determining an x-y-z grasp position for picking up the object.

10. The method according to claim 1 wherein identifying a location for picking up the object includes identifying a grasp orientation for picking up the object that is defined by a ray direction from the camera to the center pixel.

11. The method according to claim 10 wherein the ray direction is determined by a pin-hole camera model.

12. The method according to claim 10 wherein identifying a location for picking up the object includes determining a grasp pose for picking up the object using the grasp position and the grasp orientation.

13. The method according to claim 12 wherein the object is picked up by a robot and the grasp pose determines the pose of a robot end-effector.

14. The method according to claim 1 wherein the objects are transparent.

15. A method for picking up a transparent object from a group of transparent objects using a robot, said method comprising:
    obtaining a 2D red-green-blue (RGB) color image of the objects using a 3D camera;
    obtaining a 2D depth map image of the objects using the 3D camera, where pixels in the depth map image are assigned a value identifying the distance from the camera to the objects;
    generating a segmentation image of the objects by performing an image segmentation process using a deep learning neural network that extracts features from the RGB image, assigns a label to pixels in the segmentation image so that each object in the segmentation image has the same label and determines an orientation of the objects;
    identifying a location for picking up the object using the segmentation image and the depth map image; and
    rotating the object using the orientation of the object in the segmentation image, wherein obtaining a color image, obtaining a depth map image, generating a segmentation image, identifying a location for picking up the object and rotating the object are performed each time an object is picked up from the group of objects by the robot.

16. The method according to claim 15 wherein generating a segmentation image includes providing a plurality of bounding boxes having the same size and a plurality of bounding boxes of the same size that are oriented in different directions, aligning the bounding boxes to the extracted features using a sliding window template, providing a bounding box image that includes bounding boxes surrounding the objects, determining the probability that an object exists in each bounding box and identifying a center pixel of each object in the bounding boxes.

17. The method according to claim 15 wherein identifying a location for picking up the object includes identifying a center pixel of one of the objects in the segmentation image that has the highest probability that it exists, calculating x-y-z coordinates of the center pixel using the center pixel and the depth map image, determining an x-y-z grasp position of the robot for picking up the object, identifying a grasp orientation of the robot for picking up the object that is defined by a ray direction from the camera to the center pixel using a pin-hole camera model, and determining a grasp pose of the robot for picking up the object using the grasp position and the grasp orientation.

18. A robot system for picking up an object from a group of objects using a robot, said system comprising:
    a camera that provides an image of the objects;
    a neural network that generates a segmentation image of the objects by performing an image segmentation process that extracts features from the image and assigns a label to pixels in the segmentation image so that each object in the segmentation image has the same label, wherein the neural network provides a plurality of bounding boxes having the same orientation, aligns the bounding boxes to the extracted features using a sliding window template, provides a bounding box image that includes bounding boxes surrounding the objects, determines the probability that an object exists in each bounding box and identifies a center pixel of each object in the bounding boxes;
    means for identifying a location for picking up the object using the segmentation image; and
    means for rotating the object using the orientation of the object in the segmentation image, wherein obtaining an image, generating a segmentation image, identify a location for picking up the object and rotating the object are performed each time an object is picked up from the group of objects by the robot.

19. The method according to claim 18 wherein the objects are transparent.

20. A method for picking up an object from a group of objects, said method comprising:
    obtaining an image of the objects using a camera;
    generating a segmentation image of the objects by performing an image segmentation process that includes using neural networks to extract features from the image to provide an extracted features image, identifying x and y coordinates of pixels in the extracted features image and identifying an orientation of the objects in the extracted features image, wherein generating a segmentation image includes identifying a center pixel of each object, providing a plurality of bounding boxes, aligning the bounding boxes to the extracted features and providing a bounding box image that includes bounding boxes surrounding the objects;

identifying a location for picking up the object using the segmentation image, wherein identifying a location for picking up the object includes identifying the center pixel of one of the objects in the segmentation image and calculating x-y-z coordinates of the center pixel using the location of that center pixel and a depth map image; and rotating the object using the orientation of the object in the segmentation image, wherein the objects are transparent.

\* \* \* \* \*